United States Patent [19]

Goto

[11] Patent Number: 5,321,461
[45] Date of Patent: Jun. 14, 1994

[54] FOCUS DETECTING DEVICE

[75] Inventor: Hisashi Goto, Musashino, Japan

[73] Assignee: Olympus Optical Co., Ltd., Tokyo, Japan

[21] Appl. No.: 929,428

[22] Filed: Aug. 14, 1992

[30] Foreign Application Priority Data

Aug. 22, 1991 [JP] Japan ................... 3-211019
Nov. 12, 1991 [JP] Japan ................... 3-295872

[51] Int. Cl.⁵ ............................................. G03B 13/18
[52] U.S. Cl. ................................................. 354/406
[58] Field of Search ............... 354/406, 407, 408, 402

[56] References Cited

U.S. PATENT DOCUMENTS

| | | | |
|---|---|---|---|
| 4,841,326 | 6/1989 | Koyama et al. | 354/406 |
| 4,859,842 | 8/1989 | Suda et al. | 354/408 X |
| 4,900,911 | 2/1990 | Matsui et al. | 354/406 X |
| 4,959,677 | 9/1990 | Suda et al. | 354/406 X |
| 4,982,219 | 1/1991 | Uchiyama | 354/408 |
| 5,138,143 | 8/1992 | Ishida et al. | 354/408 X |

FOREIGN PATENT DOCUMENTS

| | | |
|---|---|---|
| 55-118019 | 9/1980 | Japan . |
| 58-106511 | 6/1983 | Japan . |
| 60-32012 | 2/1985 | Japan . |
| 63-88511 | 4/1988 | Japan . |
| 63-118112 | 5/1988 | Japan . |
| 63-264715 | 11/1988 | Japan . |
| 6456407 | 3/1989 | Japan . |
| 2132407 | 5/1990 | Japan . |

*Primary Examiner*—Russell E. Adams
*Assistant Examiner*—Jae N. Noh
*Attorney, Agent, or Firm*—Cushman, Darby & Cushman

[57] ABSTRACT

A focus detecting device includes a plurality of focus detecting systems each having a condenser lens, an aperture stop with pairs of apertures, a reimaging optical system, and light receiving element arrays. The pairs of apertures in the aperture stop are arranged in different directions. The magnifications, focal length and principal points of the reimaging optical systems differ from one another such that images are reformed on the same plane. Thus, the focus detecting device extends the focus detecting area, improves the focusing accuracy, and allows focus detection irrespective of the directions of contrast.

14 Claims, 8 Drawing Sheets

FOCUS DETECTING DEVICE

BACKGROUND OF THE INVENTION a) Field of the Invention

This invention relates to a focus detecting device for use in cameras.

b) Description of the Prior Art

As an example of conventional focus detecting devices, an arrangement is made such that an image formed by a photographic lens is divided into two by a reimaging optical system, which are re-formed on light receiving element arrays (photoelectric converting element arrays), and the positional shift of the two images is detected, thereby allowing focus detection to be made. For such a device, various proposals have been made in the past as set forth, for example, in Japanese Patent Preliminary Publication Nos. Sho 55-118019, Sho 58-106511, and Sho 60-32012. Any of these proposed devices is adapted to use light receiving element arrays in a line for focus detection and has the following characteristics.

In a focus detecting (optical) system, the size of a focus detecting area is usually incompatible with focusing accuracy. That is, the light receiving element array is such that light receiving elements are generally arrayed at equal spaces and, when the space between two light receiving elements adjacent to each other is taken as one pitch, focusing accuracy is usually represented as a measure relative to one pitch. Now, when focusing accuracy is assumed to be $1/M$ (M is a constant) of one pitch and the amount of defocus per pitch at the image plane is taken as $\alpha$, a focusing accuracy $\Delta$ at the image plane is defined as $$\Delta = \pm (1/M)\alpha \quad (1)$$

Here, if the value $\Delta$ is large, focusing accuracy will be poor, while if it is smaller, focusing accuracy will be improved.

When the number of light receiving elements of the light receiving element array is taken as N (constant), a detectable defocus area $\Sigma$ at the image plane is given by $$\Sigma = |\pm N\alpha| \quad (2)$$

Here, if the amount of defocus is increased, the focus detecting area $\Sigma$ will be large but the focusing accuracy $\Delta$ will be poor. Conversely, if the amount of defocus $\alpha$ is decreased, the focusing accuracy $\Delta$ will be improved but the focus detecting area $\Sigma$ will be diminished, and thus both are incompatible with each other. Hence, the use of the devices of the above mentioned prior art makes it impossible to satisfy the conditions of the focus detecting area and the focusing accuracy at once and to perform complete focus detection.

Further, the conventional device of the type is constructed so that light receiving element arrays are made in a line as a focus detecting system and the amount of defocus of the photographic lens is detected from contrast information only in one direction of an object corresponding to the light receiving element arrays, with the result that focus detection cannot be performed with respect to an object having no contrast in the directions in which the light receiving elements are arrayed.

In order to obviate these drawbacks, a focus detecting device provided with a plurality of focus detecting systems, which will be described below, is proposed. An example of such a device is shown in Japanese Patent Preliminary Publication No. Sho 63-88511. This focus detecting device is designed so that the extension of the focus detecting area and the improvement of the focusing accuracy are satisfied at once and focus detection can be effected irrespective of the directions of contrast of the object.

Figure 1:
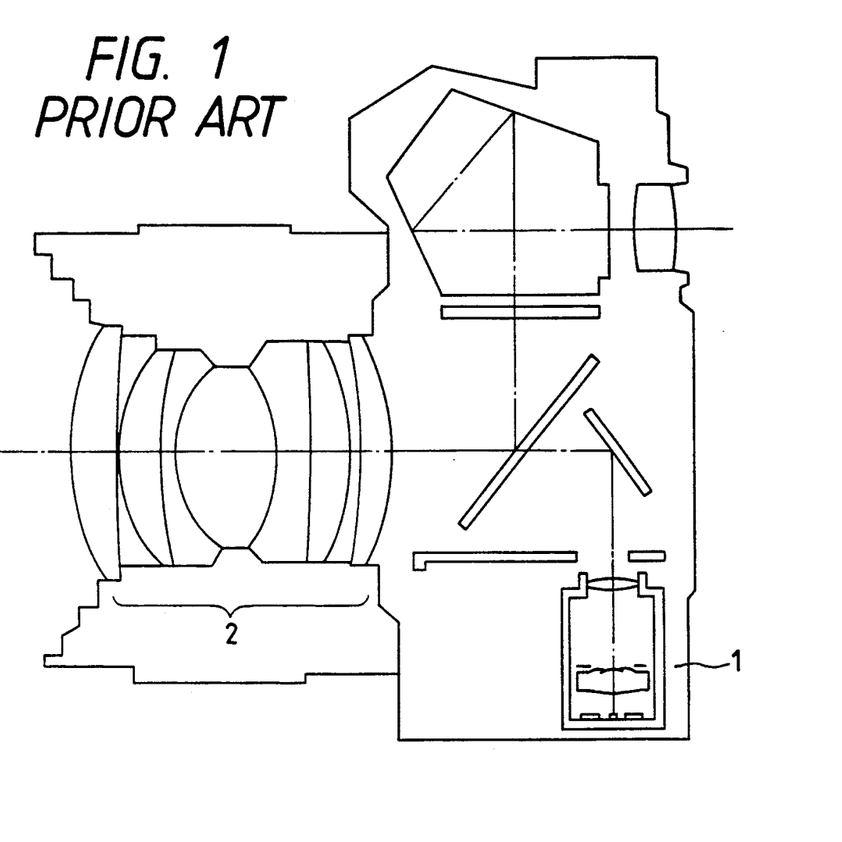
FIG. 1 is a schematic sectional view showing a camera equipped with a conventional focus detecting device.
Figure 2:
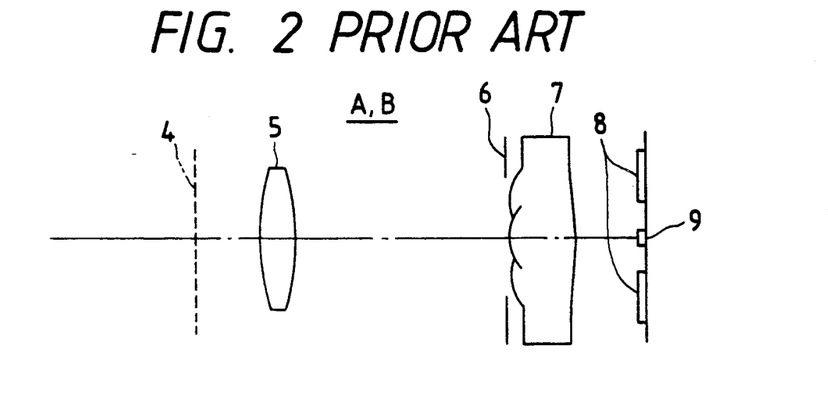
FIG. 2 is an enlarged view showing an optical system of the focus detecting device shown in FIG. 1.
Figure 3:
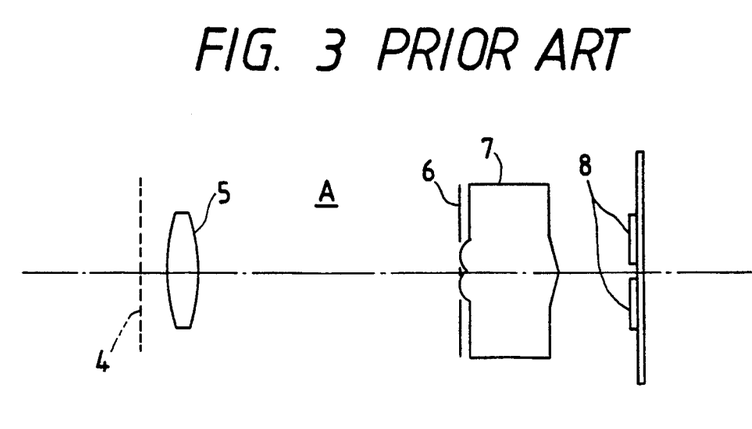
FIGS. 3 and 4 are views showing first and second focus detecting systems, respectively, of the optical system shown in FIG. 2.
Figure 4:
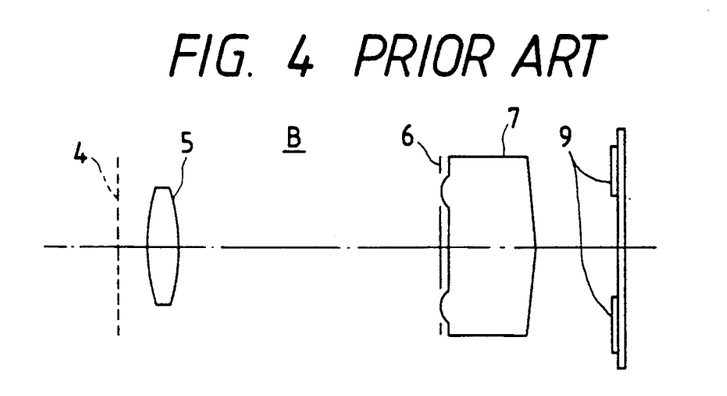
Figure 5:
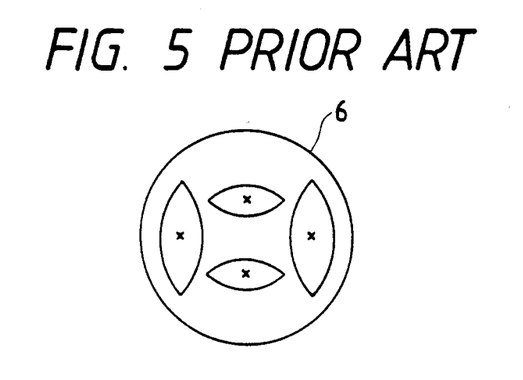
FIGS. 5 to 7 are front views showing an aperture stop, a separator lens, and light receiving element arrays, respectively, in the focus detecting systems.
Figure 6:
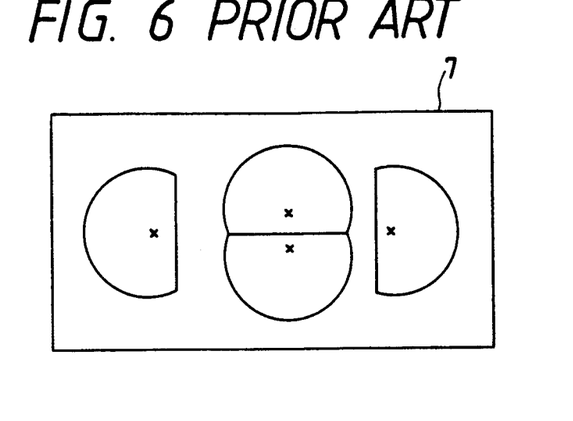
Figure 7:
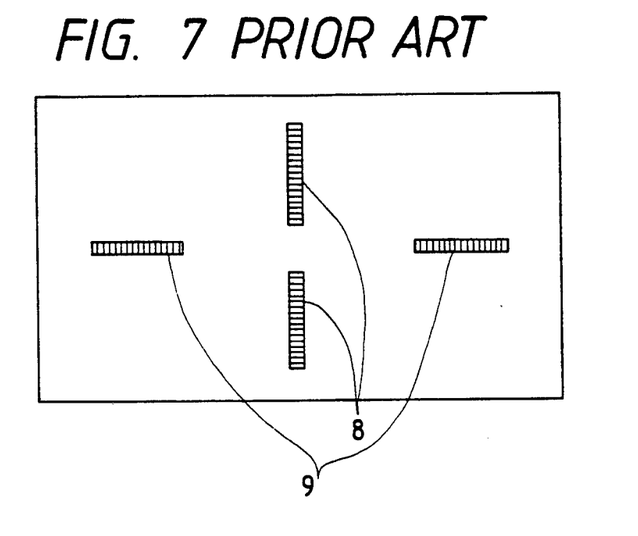

FIG. 1 shows a camera body, on the bottom of which a focus detecting device 1 is arranged. FIG. 2 shows an optical arrangement of the focus detecting device 1 including two focus detecting systems A and B perpendicular to each other. For these systems, FIG. 3 depicts the focus detecting system A, and FIG. 4 the focus detecting system B, perpendicular to the focus detecting system A, in a state where the system B is rotated 90° about the optical axis with respect to FIG. 3. In the figures, for the focus detecting device 1, a condenser lens 5 is disposed behind and adjacent to a preset imaging plane 4 of a photographic lens 2, and an aperture stop 6 is disposed behind the condenser lens 5 as shown in FIG. 5, two pairs of apertures are punched in aperture stop 6 in directions perpendicular to each other, and two apertures having a space sufficient to ensure focusing accuracy for each pair. A separator lens 7 is disposed behind the aperture stop 6 and has two pairs of reimaging lenses perpendicular to each other, and as illustrated in FIG. 6 corresponding to individual apertures. Behind the separator lens 7, two pairs of light receiving element arrays 8 and 9 are disposed in directions normal to each other. As shown in FIG. 7, light receiving element arrays 8 and 9 are disposed at imaging positions of individual beams of light emerging from the separator lens 7. Individual light beams passing through the apertures of the aperture stop 6 are independent of one another. The two focus detecting systems A and B perpendicular to each other consist of a first focus detecting system A and a second focus detecting system B, respectively. The amounts of defocus to be detected in terms of the first and second focus detecting systems A and B are determined as follows:

$$D_1 = (F_{W1}/\beta_1) P_1 \quad (3)$$

$$D_2 = (F_{W2}/\beta_2) P_2 \quad (4)$$

where $D_1$ is the amount of defocus to be detected in the first focus detecting system A, $D_2$ is the amount of defocus to be detected in the second focus detecting system B, $P_1$ is the amount of phase difference of the images on the light receiving element arrays 8 of the first focus detecting system A, $P_2$ is the amount of phase difference of the images on the light receiving element arrays 9 of the second focus detecting system B, $\beta_1$ is the imaging magnification of the first focus detecting system A, $\beta_2$ is the imaging magnification of the second focus detecting system B, $F_{W1}$ is the F number of the barycentric beam to be detected in the first focus detecting system A, and $F_{W2}$ is the F number of the barycentric beam to be detected in the second focus detecting system B. Here, the term "barycentric beam" means the light beam defined by rays passing through the center of each aperture of the aperture stop.

In Equations (3) and (4), the amounts of defocus $D_1$ and $D_2$ are determined by properly setting the F numbers $F_{W1}$ and $F_{W2}$ and the magnifications $\beta_1$ and $\beta_2$ of the first and second focus detecting systems A and B. Then, in connection with Equations (1) and (2), for example, the first focus detecting system A can be constructed as an optical system which is somewhat low in focusing accuracy but large in detectable defocus area, while the second focus detecting system B as another optical system which is smaller in focus detecting area but higher in focus accuracy. Thus, the focus detecting device can be derived which satisfies the conditions of the extension of the focus detecting area and the improvement of the focusing accuracy at once. In this optical system, however, the positional relationships between the primary imaging plane 4, the condenser lens 5, the separator lens 7, and the light receiving element arrays 8 and 9 and the configuration of the condenser lens 5 are the same in the first and second focus detecting systems, because the imaging magnifications $\beta_1$ and $\beta_2$ must be equal in order to dispose the light receiving element arrays on the same plane. For this purpose, it is required that the difference between the F numbers $F_{W1}$ and $F_{W2}$ is increased to fully satisfy the conditions of the extension of the focus detecting area and the improvement of the focusing accuracy at once. If the first focus detecting system A has low contrast in the directions of the light receiving element arrays, focusing can be performed by the second focus detecting system B.

Figure 8:
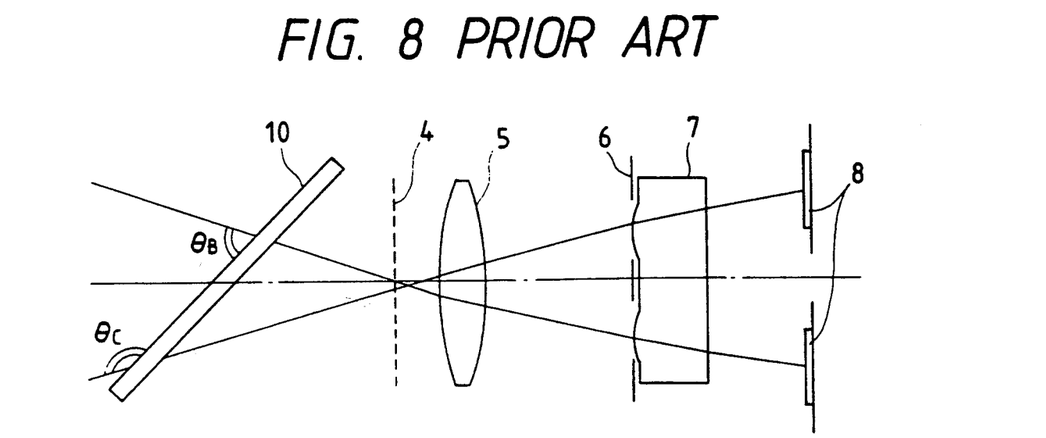
FIG. 8 is a view showing an optical system of another conventional focus detecting device.

For at least one of the plural focus detecting systems, according to this suggestion, two beams leaving the photographic lens for entering a pair of light receiving element arrays 8, as shown in FIG. 8, are incident at different angles $\theta_B$ and $\theta_C$ on a quick-return mirror 10 constructed from a half mirror. The two beams are therefore subjected to different refracting actions, and the spectral transmittance of the half mirror varies with the incident angle, so that the characteristics of spectra incident on the sensors for the two beams are also different. This makes it impossible to effect accurate focus detection. On the contrary, Japanese Patent Preliminary Publication Nos. Sho 63-118112 and Sho 64-56407 each propose the method of correcting the different refracting actions attributable to the half mirror by designing the separator lens asymmetrically. Japanese Patent Preliminary Publication No. Hei 2-132407 discloses the technique of evaporating a dielectric multilayer film such that the spectral transmittance of the half mirror does not vary with the incident angle.

By the means mentioned above, the focus detecting device can be designed which satisfies the conditions of the extension of the focus detecting area and the improvement of the focusing accuracy at once. Further, the focus detecting device detectable, irrespective of the directions of contrast of the object, can be constructed. Provisions have also been made for the difference between the refracting actions and the variation of the spectral transmittance of the half mirror with the incident angle where two beams are incident at different angles on the quick-return mirror using the half mirror. The method of configuring the separator lens asymmetrically, however, requires correction for errors produced on assembling the optical system in order to cancel securely the different refracting actions caused by the quick-return mirror and the disadvantage in manufacture and assembly of the optical system. When the separator lens of plural focus detecting systems is integrally constructed in particular, this tendency becomes pronounced. In order that the spectral transmittance of the half mirror does not vary with the incident angle, it is necessary to be severe on the tolerance of thickness of the dielectric multilayer film. Nevertheless, the variation of the spectral transmittance with the incident angle cannot be made to vanish completely.

Figure 9:
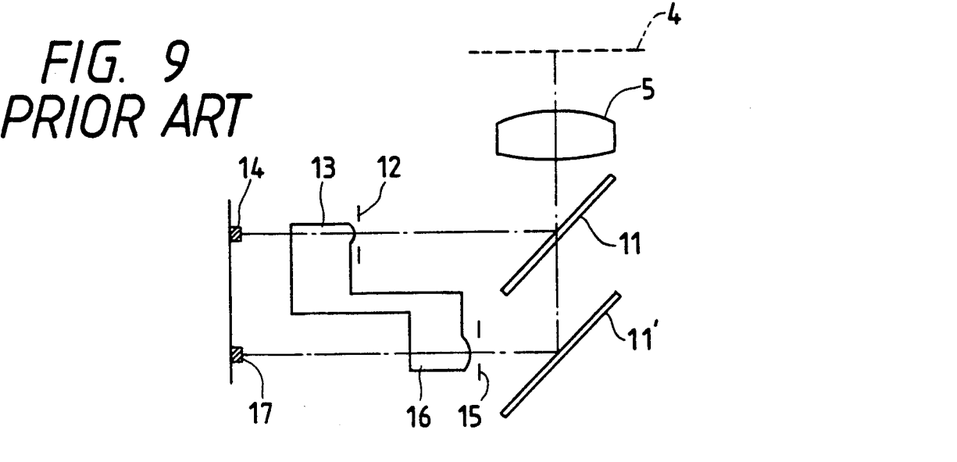
FIG. 9 is a view showing an optical system of still another conventional focus detecting device.

Another detecting device satisfying the condition of both the focus detecting area and the focusing accuracy is proposed by Japanese Patent Preliminary Publication No. Sho 63-264715. The optical system shown in FIG. 9 is directed to a focus detecting device in which two focus detecting systems are juxtaposed which is based on a TTL phase difference technique used in one embodiment of the proposed device. In this figure, a half mirror 11 for splitting an optical path and a reflecting mirror 11' are placed behind the condenser lens 5. On the optical path reflected from the half mirror 11 are arranged in order an aperture stop 12 having a pair of apertures juxtaposed, normal to the plane of the figure, at a distance sufficient to ensure focusing accuracy; a pair of reimaging lenses 13 located behind the apertures; and light receiving element arrays 14 placed at imaging positions of beams of light passing through the reimaging lenses 13. On the optical path transmitted through the half mirror 11 and reflected from the mirror 11', on the other hand, are arranged in order an aperture stop 15 having a pair of apertures juxtaposed, normal to the plane of the figure, at a distance sufficient to ensure focusing accuracy; a pair of reimaging lenses 16 constructed integral with, but different in location from, the reimaging lenses 13; and light receiving element arrays 17 situated at imaging positions of beams of light passing through the reimaging lenses 16.

An optical system lying on the optical path reflected from the half mirror 11 is to be the first focus detecting system A and another optical system lying on the optical path reflected from the mirror 11' is to be the second focus detecting system B. In this case, the amounts of defocus to be detected in terms of the focus detecting systems A and B are calculated from Equations (3) and (4) mentioned above.

Even in the case where the light receiving element arrays 14 and 17 are arranged on the same plane, the focus detecting device, unlike the prior art device early described (JP 63-88511), is designed to be able to set arbitrarily the spaces between the condenser lens 5 and the reimaging lenses 13 and 16, and between the reimaging lenses 13 and 16 and the light receiving element arrays 14 and 17, respectively, so that the imaging magnifications $\beta_1$ and $\beta_2$ can be made different from each other.

However, in the type of focus detecting devices such as JP 63-88511, the magnifications of the first and second focus detecting systems A and B need to be made equal and hence, must be intended for the extension of the focus detecting area and the improvement of the focusing accuracy according to the difference between the F numbers $F_{W1}$ and $F_{W2}$ of the barycentric beams. If the difference between the F numbers $F_{W1}$ and $F_{W2}$ is largely set, the F number of the photographic lens will be excessively small which is detectable in the focus detecting system intended for the improvement of the focusing accuracy, of the two focus detecting systems, and the photographic lens will be strictly limited in application. Alternatively, it is necessary to reduce the sizes of the apertures of the aperture stops in the focus detecting systems, with the resultant defect that a sufficient amount of light is not introduced to the light receiving element arrays and focus detection becomes difficult or impossible with respect to the object of low luminance.

Figure 10:
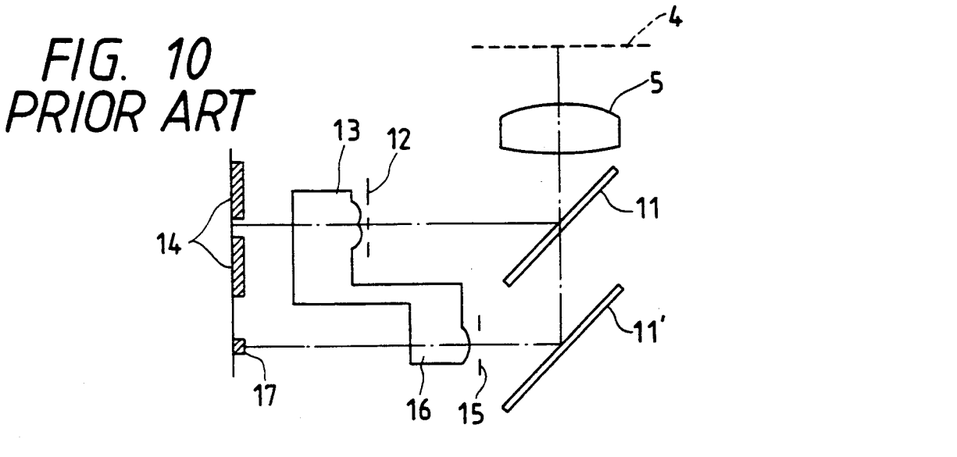
FIG. 10 is a view showing the optical system similar to FIG. 9, except that the directions of two pairs of light receiving element arrays are different from each other.
Figure 11:
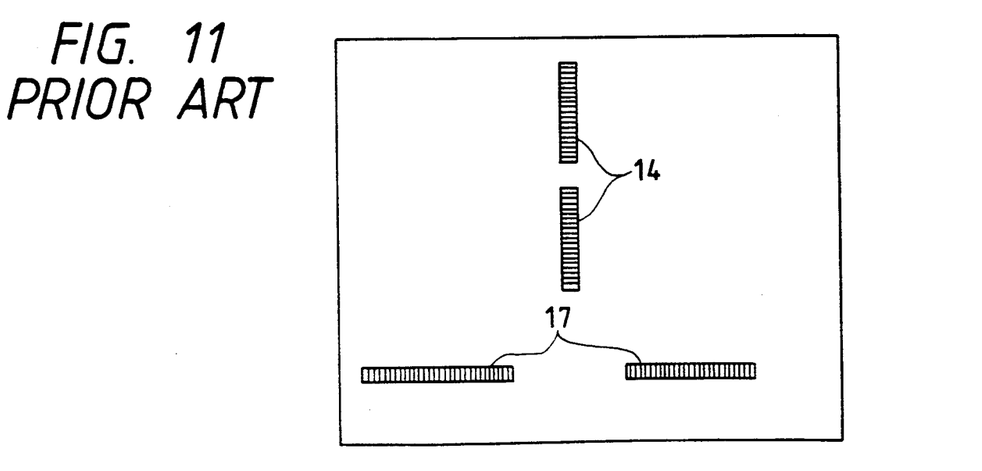
FIG. 11 is a front view showing the light receiving element arrays in FIG. 10.

Judging from the constructions the inventor worked out as shown in FIGS. 10 and 11, if the directions of the light receiving element arrays 14 and 17 of the focus detecting systems A and B are different, focus detection can be performed irrespective of the directions of contrast of the object. But the inventor found out that this constructions had defects as stated below.

Although the preceding problem is obviated because the difference between the magnifications is brought about by the two focus detecting systems, the images of the two focus detecting systems are formed farther away from each other and hence the area required for all the light receiving elements increases. Consequently, the defects are developed that the favorability of the light receiving elements is reduced and oversizing of the entire focus detecting system is brought about to adversely affect the compactness of the camera. Further, the mechanism is complicated and the assembly is incomplete, since adjustments are required for the half mirror 11 splitting the optical path into two focus detecting systems A and B and for the focus detecting systems A and B.

SUMMARY OF THE INVENTION

It is, therefore, a primary object of the present invention to provide a focus detecting device which satisfies the conditions of the extension of the focus detecting area and the improvement of the focusing accuracy at once, has no effect on light transmitted through the half mirror, is easy in manufacture and mounting, and can perform focus detection irrespective of the directions of contrast of an object.

Another object of the present invention is to provide a focus detecting device which satisfies the conditions of the extension of the focus detecting area and the improvement of the focusing accuracy at once, allows focus detection irrespective of the directions of contrast of an object, is applicable to a photographic lens with a relatively large F number, is compact in design, and is easy of mounting.

In order to attain the primary object of the present invention, the focus detecting device includes a plurality of focus detecting systems for receiving two beams of light passing through different areas of the photographic lens through a photoelectric converting means to make use of a phase difference between output signals representing the intensity distribution of light derived from the photographic converting means, and a half mirror obliquely disposed on an optical axis between the photographic lens and the plurality of focus detecting systems, in which the difference between the incident angles of the two beams on the half mirror in one focus detecting system having the highest focusing accuracy, of the plurality of focus detecting systems, is smaller than that of the other.

Reference is now made to this matter in more detail. Where the directions in which the two beams emerging from the photographic lens travel are parallel to the rotary axis of the quick-return mirror, the two beams are equal in the incident angles on the quick-return mirror, subjected to the same refracting action, and equivalent to each other in spectral transmittance. In the present invention, the focus detecting device have been constructed from one focus detecting system having a broad detectable defocus area and the other focus detecting system having a narrower focus detecting area but a more excellent focusing accuracy in which the directions of the two beams emerging from the photographing lens used in the latter system are made parallel to the rotary axis of the quick-return mirror, thereby satisfying the conditions of the extension of the focus detecting area and the improvement of the focusing accuracy at once, having no effect on light transmitted through the half mirror, and providing easy manufacture and mounting. For the former system, in this case, the two beams are different in manner of undergoing the refracting action and variation of the spectral transmittance and thus focusing accuracy is lowered. The former system, however, which is originally low in focusing accuracy, has no material effect. Further, the focus detecting system having a broad detectable defocus area makes smaller the difference between the incident angles on the half mirror, due to its large F number, and hence is hard to undergo the effect of the half mirror.

The focus detecting device according to the present invention has the features: (1) the first focus detecting system is made longer in focal length of the separator lens than the second focus detecting system, (2) the first focus detecting system is made smaller in thickness between the planes of incidence and emergence of the reimaging lens than the second focus detecting system, and (3) the light receiving element arrays which are the sensors of the first and second focus detecting systems are arranged on substantially the same plane. By these three features, the conditions of the extension of the focus detecting area and the improvement of the focusing accuracy are satisfied at once, even if the difference between the F numbers $F_{W1}$ and $F_{W2}$ is not increased. That the difference between the F numbers $F_{W1}$ and $F_{W2}$ may not be increased means that it is not necessary to make extremely small the F number $F_{W1}$, and even though the photographic lens of a relatively large F number is employed, focusing can be performed by the first focus detecting system having excellent focusing accuracy.

The focus detecting device according to the present invention can also be constructed on further features: (1) the principal point of the separator lens of the first focus detecting system is provided on the primary imaging plane side of that of the second focus detecting system and (2) the light receiving element arrays which are the sensors of the first and second focus detecting systems are arranged on substantially the same plane. This arrangement also brings about the same effect as mentioned above.

According to one aspect for accomplishing another object of the present invention, the focus detecting device includes a focus detecting system comprising a condenser lens disposed adjacent to a preset imaging plane of a photographic lens, an aperture stop having a pair of apertures spaced enough to ensure focusing accuracy, a reimaging lens disposed behind the aperture stop, and light receiving element arrays placed at imaging positions for the reimaging lens, so that two beams of light passing through different areas of the photographic lens are received by the light receiving element arrays and focus detection is performed by detecting the phase difference between output signals indicative of the intensity distribution of light derived from the light receiving element arrays, the focus detecting system being constructed as a plural so as to vary the directions in which the apertures of the aperture stop are arranged in pairs, wherein beams of light passing through the apertures are independent of one another and the magnifications of a first focus detecting system and a second focus detecting system which constitute a plurality of focus detecting systems are different.

According to another aspect of the present invention, when the absolute value of the magnification of the first focus detecting system is taken to be larger than that of the second focus detecting system, the focal length of the reimaging lens of the first focus detecting system is made longer than that of the second focus detecting system and the thickness between the planes of incidence and emergence of the reimaging lens of the first focus detecting system is made smaller than that of the second focus detecting system to provide the light receiving element arrays of both systems on the same plane.

According to still another aspect of the present invention, the position of the principal point of the reimaging lens of the first focus detecting system is located on the primary imaging plane side of that of the second focus detecting system to provide the light receiving element arrays on the same plane.

By the foregoing arrangement, even in the case where the F numbers of the barycentric beams of both systems are not made to be appreciably different from each other, or are the same, focusing accuracy can completely be improved by the first focus detecting system and the extension of the focus detecting area can be accomplished by the second focus detecting system. Further, since it is not necessary to increase the area covered by the light receiving element arrays, the focus detecting device which is compact in size and easy of mounting can be derived. Moreover, this arrangement does away with the need for a large difference between the F numbers of the barycentric beams, so that it is not necessary to extremely decrease the F number of the barycentric beam of the first focus detecting system and the photographic lens of a relatively large F number can also be applied. This means that even in the case of the photographic lens of a relatively large F number, the improvement of the focusing accuracy is accomplished and focus detection can be performed irrespective of the directions of contrast. By making $F_{W1}/\beta_1$ of the first focus detecting system equal to $F_{W2}/\beta_2$ of the second focus detecting system and setting the aperture stop of a principal focus detecting system to have larger apertures, focus detection can be accomplished, without changing the focusing accuracy, irrespective of the directions of contrast. For an object having contrast in the directions in which principal light receiving elements are arranged, the focus detecting device can be constructed which provides focus detection not only at high luminance but at lower luminance.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

The embodiments of the present invention will be described below, in which like reference numerals are used to designate like members with the prior art already mentioned and explanations for these numerals are omitted.

Figure 12:
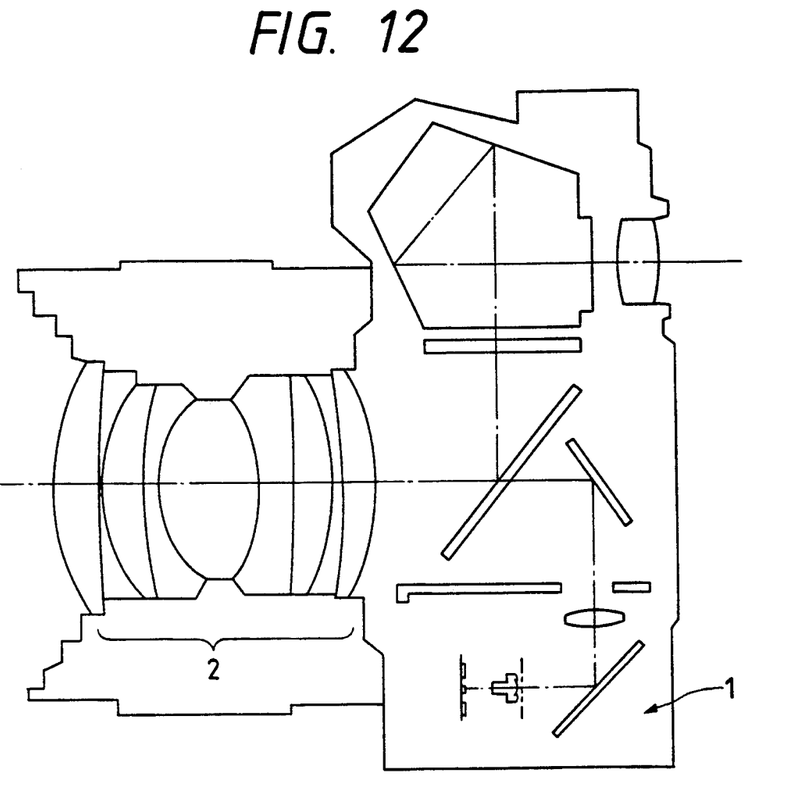
FIG. 12 is a schematic sectional view showing a camera housing a focus detecting device of a first embodiment according to the present invention.
Figure 13:
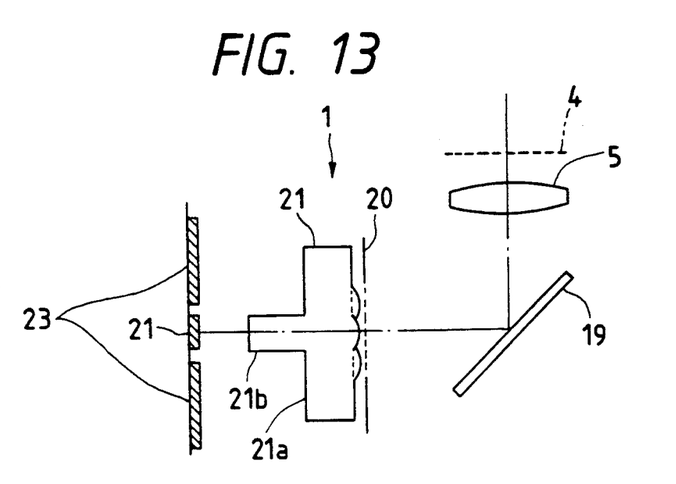
FIG. 13 is an enlarged view showing an optical system of the first embodiment.
Figure 14:
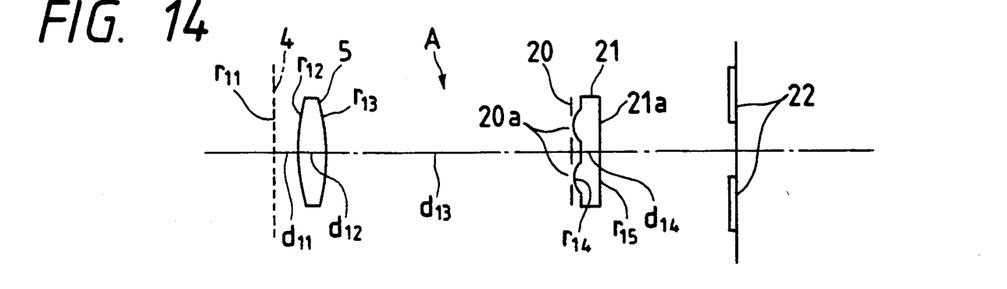
FIGS. 14 and 15 are views showing first and second focus detecting systems, respectively, in the optical system of the first embodiment.
Figure 15:
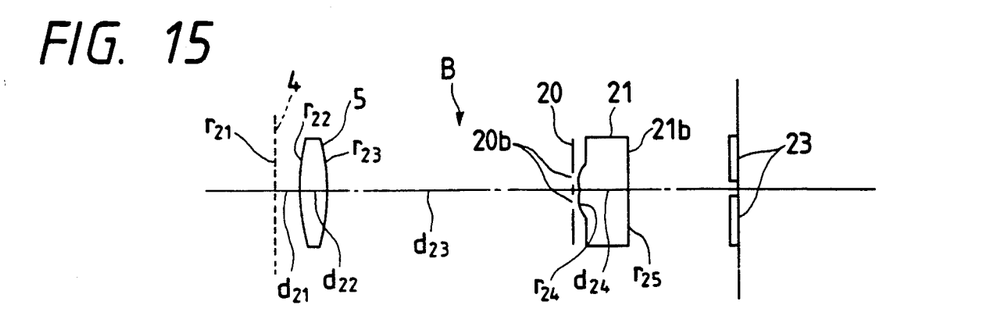

FIGS. 12 to 15 show a first embodiment of the present invention. Specifically, FIG. 12 is a schematic longitudinal sectional view showing a single-lens reflex camera provided with a focus detecting device 1 according to the first embodiment on the bottom of the camera body, FIG. 13 is a view showing an optical system of the focus detecting device 1, FIG. 14 is a view showing a first focus detecting system, and FIG. 15 is a view showing a second focus detecting system looking from the direction in which the optical system shown in FIG. 13 is turned 90° about the optical axis from the situation of FIG. 14. In these figures, reference numeral 19 denotes a reflecting mirror for bending an optical path, disposed behind the preset imaging plane 4 of the photographic lens 2 the camera and the condenser lens 5, and 20 represents an aperture stop disposed on the reflected optical path, having a pair of apertures 20a of a first focus detecting system A juxtaposed in a direction normal to the plane of the figure at a distance sufficient to ensure focusing accuracy (refer to FIG. 14) and a pair of apertures 20b of a second focus detecting system B juxtaposed in a direction parallel to the plane of the figure at a distance sufficient to ensure focus accuracy (refer to FIG. 15). Reference numeral 21 represents a separator lens disposed behind the aperture stop 20, having a reimaging lens 21a by which beams of light passing through the apertures 20a of the first focus detecting system A are transmitted and a reimaging lens 21b by which beams of light passing through the apertures 20b of the second focus detecting system B are transmitted and which is larger in thickness than the reimaging lens 21a. The reimaging lens 21a of the first focus detecting system A has a greater focal length but a less thickness than the reimaging lens 21b of the second focus detecting system B. Individual beams are thus set to be imaged on the same plane. Reference numeral 22 designates light receiving element arrays located at the imaging positions of the light beams emerging from the reimaging lens 21a of the separator lens 21, and 23 denotes light receiving element arrays provided in a direction perpendicular to the light receiving element arrays 22, on the same plane, at the imaging positions of the light beams emerging from the reimaging lens 21b of the separator lens 21.

The first embodiment is constructed as in the foregoing. In the first focus detecting system A, as depicted In FIG. 14, the light beams leaving the photographic lens 2, after being formed as a primary image on the preset Imaging plane 4, pass through the condenser lens 5 and the apertures 20a of the aperture stop 20, are transmitted through the reimaging lens 21a of the separator lens 21, and are formed as a pair of secondary images $I_{11}$ and $I_{12}$ on the light receiving element arrays 22. In the second focus detecting system B, on the other hand, as shown In FIG. 15, the light beams likewise imaged on the preset ladling plane 4, passing through the condenser lens 5 and the apertures 20b of the aperture stop 20, are transmitted through the reimaging lens 21b of the separator lens 21, and are formed as a pair of secondary images $I_{21}$ and $I_{22}$ on the light receiving element arrays 23. Here, the reimaging lens 21a of the first focus detecting system A has a greater focal length but a less thickness than the reimaging lens 21b of the second focus detecting system B, so that the light beams of the first and second focus detecting systems A and B are imaged on almost the same plane.

Thus, the first and second focus detecting systems A and B come to possess the characteristics that the former is narrow in detectable defocus area but excellent in focusing accuracy, while the latter has somewhat lower focus accuracy but a broader detectable defocus area. As a result, the focus detecting device 1 combining the focus detecting systems A and B can satisfy the conditions of the extension of the focus detecting area and the improvement of the focusing accuracy at once. Additionally, the focus detecting systems, which are different in magnification, do away with the need for a large difference between the F numbers of the barycentric beams, so that it is not necessary to extremely decrease the F number of the barycentric beam of the first focus detecting system A and even if the photographic lens has a relatively large F number, the first focus detecting system A can be applied.

Hence, for most of the photographic lenses, rough focusing is performed by the second focus detecting system B and focusing of a high degree of accuracy can be accomplished by the first focus detecting system A.

If a focus shift is slight, focusing can, as a matter of course, be directly commenced by the first focus detecting system A. Further, if there is low contrast in the directions of the light receiving element arrays 22 of the first focus detecting system A, focusing can be performed by the second focus detecting system B.

In order that the direction in which the pupil of the first focus detecting system A is divided is not Inclined with respect to the quick-return mirror of the camera, it Is desirable that a pair of apertures 20a of the aperture stop 20 and the reimaging lens 21a are set in parallel with the quick-return mirror. Since the light beams from two pupils thus travel symmetrically through the quick-return mirror, they can be similarly affected by the properties of refraction and transmission spectra acquired by the quick-return mirror, and information with the same quality can be sent, symmetrical to the optical axis, to the light receiving element arrays.

According to the first embodiment, as mentioned above, the conditions of the extension of the focus detecting area and the improvement of the focus accuracy are satisfied at once, focus detection can be effected irrespective of the directions of contrast of the object, and even the photographic lens of a relatively large F number is applicable. Furthermore, the fact that it is not necessary to increase the area covered by the light receiving element arrays, makes it possible to bring about the focus detecting device 1 which is compact in size and easy of mounting. For the object having contrast in the directions in which the light receiving element arrays are provided, focus detection is also possible at low luminance.

Next, the lens data of the first embodiment are shown in Tables 1 and 2. In these data, r represents the radius of curvature; d the lens thickness or the lens spacing; n the refractive index; $\beta_1$ the imaging magnification of the first focus detecting system A; $\beta_2$ the Imaging magnification of the second focus detecting system B; $F_{W1}$ the F number of the barycentric beam to be detected in the first focus detecting system A; and $F_{W2}$ the F number of the barycentric beam to be detected in the second focus detecting system B. Since the first and second focus detecting systems A and B use the same condenser lens 5, in the following tables, the values of $r_{12}$, $r_{13}$, $d_{11}$, and $d_{12}$ are the same as those of $r_{21}$, $r_{22}$, $r_{23}$, $d_{21}$, and $d_{22}$, respectively.

TABLE 1

(First focus detecting system)

| No. | r | d | n |
|---|---|---|---|
| 1 | $r_{11} = \infty$ | $d_{11} = 1.8$ | |
| 2 | $r_{12} = 9.73$ | $d_{12} = 2.7$ | $n_{11} = 1.4971$ |
| 3 | $r_{13} = -19.45$ | $d_{13} = 13.1$ | |
| 4 | $r_{14} = 2.28$ | $d_{14} = 1.0$ | $n_{12} = 1.4971$ |
| 5 | $r_{15} = \infty$ | | |
| | $\beta_1 = -0.44$ | | $F_{W1} = 6$ |

TABLE 2

(Second focus detecting system)

| No. | r | d | n |
|---|---|---|---|
| 1 | $r_{21} = \infty$ | $d_{21} = 1.8$ | |
| 2 | $r_{22} = 9.73$ | $d_{22} = 2.7$ | $n_{21} = 1.4971$ |
| 3 | $r_{23} = -19.45$ | $d_{23} = 13.1$ | |
| 4 | $r_{24} = 1.92$ | $d_{24} = 4.8$ | $n_{22} = 1.4971$ |
| 5 | $r_{25} = \infty$ | | |
| | $\beta_2 = -0.35$ | | $F_{W2} = 15$ |

Figure 16:
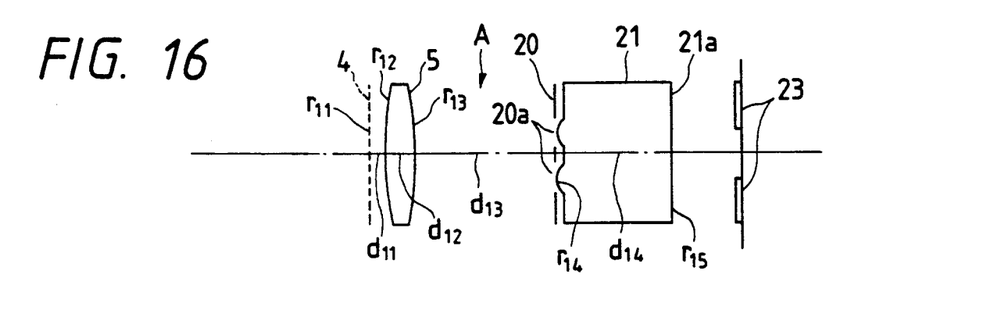
FIGS. 16 and 17 are views showing first and second focus detecting systems, respectively, in an optical system of a second embodiment according to the present invention.
Figure 17:
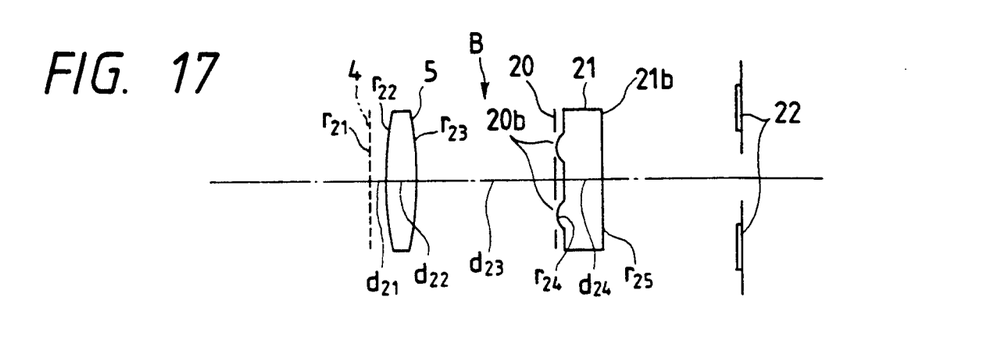

FIGS. 16 and 17 show a second embodiment of the present invention. FIG. 16 is a view showing the first focus detecting system A and FIG. 17 is a view showing the second focus detecting system B when turned 90° about the optical axis from the situation of FIG. 16.

The lens data of the second embodiment are shown in Tables 3 and 4.

TABLE 3

(First focus detecting system)

| No. | r | d | n |
|---|---|---|---|
| 1 | $r_{11} = \infty$ | $d_{11} = 1.8$ | |
| 2 | $r_{12} = 9.73$ | $d_{12} = 2.7$ | $n_{11} = 1.4971$ |
| 3 | $r_{13} = -19.45$ | $d_{13} = 13.1$ | |
| 4 | $r_{14} = 1.92$ | $d_{14} = 4.8$ | $n_{12} = 1.4971$ |
| 5 | $r_{15} = \infty$ | | |
| | $\beta_1 = -0.35$ | | $F_{W1} = 15$ |

TABLE 4

(Second focus detecting system)

| No. | r | d | n |
|---|---|---|---|
| 1 | $r_{21} = \infty$ | $d_{21} = 1.8$ | |
| 2 | $r_{22} = 9.73$ | $d_{22} = 2.7$ | $n_{21} = 1.4971$ |
| 3 | $r_{23} = -19.45$ | $d_{23} = 13.1$ | |
| 4 | $r_{24} = 2.28$ | $d_{24} = 1.0$ | $n_{22} = 1.4971$ |
| 5 | $r_{25} = \infty$ | | |
| | $\beta_2 = -0.44$ | | $F_{W2} = 6$ |

In comparison with the separator lens of the first focus detecting system A, that of the second focus detecting system B is long in focal length but small in thickness, so that the light beams of the first and second focus detecting systems A and B are imaged on substantially the same plane. The arrangement is thus made such that the second focus detecting system B is narrow in detectable defocus area but excellent in focusing accuracy, and the first focus detecting system A is somewhat lower in focusing accuracy but broader in detectable defocus area. As a consequence of this, the focus detecting device satisfies the conditions of the extension of the focus detecting area and the improvement of the focusing accuracy at once and can perform focusing through the second focus detecting system B, even though the photographic lens of a relatively large F number is used. Hence, making use of most types of photographic lenses, approximate focusing can be performed by the first focus detecting system A and highly accurate focusing by the second focus detecting system B. When a focus shift is slight, focusing can, of course, be originated by the second focus detecting system B. Focusing of a high degree of accuracy does not produce the effect of refraction of the quick-return mirror. If the contrast in the directions of the light receiving element arrays of the second focus detecting system B is low, focusing can be performed by the first focus detecting system A. Also, although the thicknesses of the reimaging lenses become equal even in such a case as $\beta_1 = \beta_2$, it is needless to say that the same arrangement can be obtained.

Figure 18:
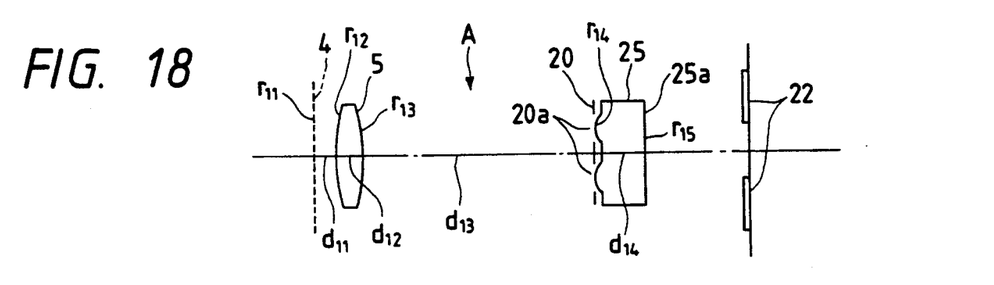
FIGS. 18 and 19 are views showing first and second focus detecting systems, respectively, in an optical system of a third embodiment according to the present invention.
Figure 19:
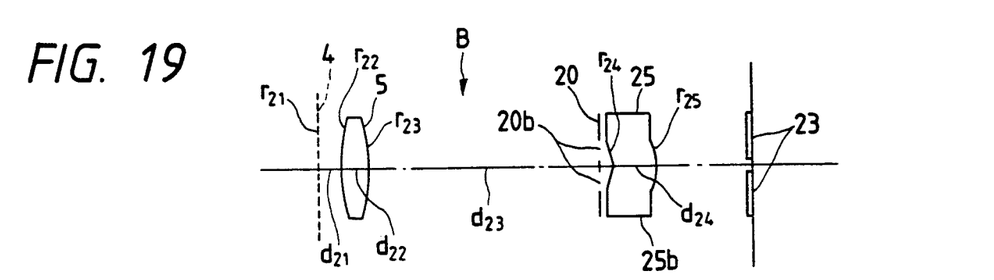
Figure 20:
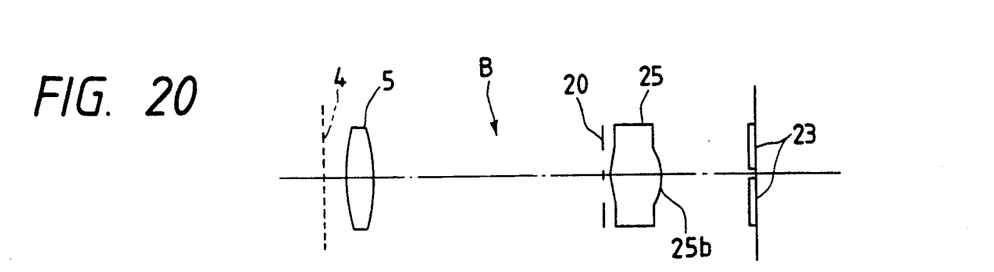
FIG. 20 is a view showing a modification example of the second focus detecting system of the third embodiment.

FIGS. 18 and 19 show a third embodiment of the present invention. FIG. 18 is a view showing the first focus detecting system A and FIG. 19 is a view showing the second focus detecting system B when turned 90° about the optical axis from the situation of FIG. 18. In these figures, instead of the separator lens 21 of the first embodiment, another separator lens 25 is disposed which is different in principal point. The separator lens 25 comprises a reimaging lens 25a, in the first focus detecting system A shown in FIG. 18, located behind the apertures 20a of the aperture stop 20 and configured with a separator lens surface constituting the plane of incidence of the light beams and a flat surface constituting the plane of emergence, and a reimaging lens 25b, in the second focus detecting system B shown in FIG. 19, located behind the apertures 20b of the aperture stop 20 and configured with a concave prism surface constituting the plane of incidence of the light beams and a lens surface constituting the plane of emergence. For the reimaging lens 25b of the second focus detecting system B, as shown in FIG. 20, the plane of incidence of the light beams may be configured into a convex prism surface.

In the third embodiment, a pair of secondary images $I_{11}$ and $I_{12}$ and a pair of secondary images $I_{21}$ and $I_{22}$ are formed on the light receiving element arrays 22 and 23 by the first and second focus detecting systems A and B, respectively. Further, although there is little difference in thickness between two reimaging lenses 25a and 25b, the principal point of the reimaging lens 25a of the focus detecting system A is positioned on the side of the condenser lens 5 with respect to that of the reimaging lens 25b of the second focus detecting system B, so that the focus detecting systems A and B are different in magnification, but the secondary images of both systems will be formed on substantially the same plane. Also, in the third embodiment, it is favorable for the security of imaging performance that the curvature of the plane of emergence and the thickness of the reimaging lens 25a is made equivalent to those of the reimaging lens 25b.

The lens data of the third embodiment are shown in Tables 5 and 6.

TABLE 5

(First focus detecting system)

| No. | r | d | n |
|---|---|---|---|
| 1 | $r_{11} = \infty$ | $d_{11} = 1.8$ | |
| 2 | $r_{12} = 9.73$ | $d_{12} = 2.7$ | $n_{11} = 1.4971$ |
| 3 | $r_{13} = -19.45$ | $d_{13} = 13.1$ | |
| 4 | $r_{14} = 2.28$ | $d_{14} = 2.0$ | $n_{12} = 1.4971$ |
| 5 | $r_{15} = \infty$ | | |
| | $\beta_1 = -0.44$ | | $F_{W1} = 6$ |

TABLE 6

(Second focus detecting system)

| No. | r | d | n |
|---|---|---|---|
| 1 | $r_{21} = \infty$ | $d_{21} = 1.8$ | |
| 2 | $r_{22} = 9.73$ | $d_{22} = 2.7$ | $n_{21} = 1.4971$ |
| 3 | $r_{23} = -19.45$ | $d_{23} = 13.1$ | |
| 4 | $r_{24} = \infty$ | $d_{24} = 2.0$ | $n_{22} = 1.4971$ |
| 5 | $r_{25} = -1.93$ | | |
| | $\beta_2 = -0.32$ | | $F_{W2} = 15$ |

Figure 21:
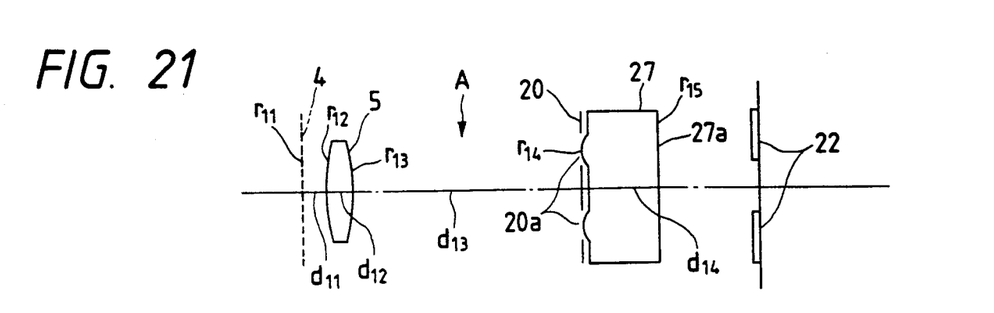
FIGS. 21 and 22 are views showing first and second focus detecting systems, respectively, in an optical system of a fourth embodiment according to the present invention.
Figure 22:
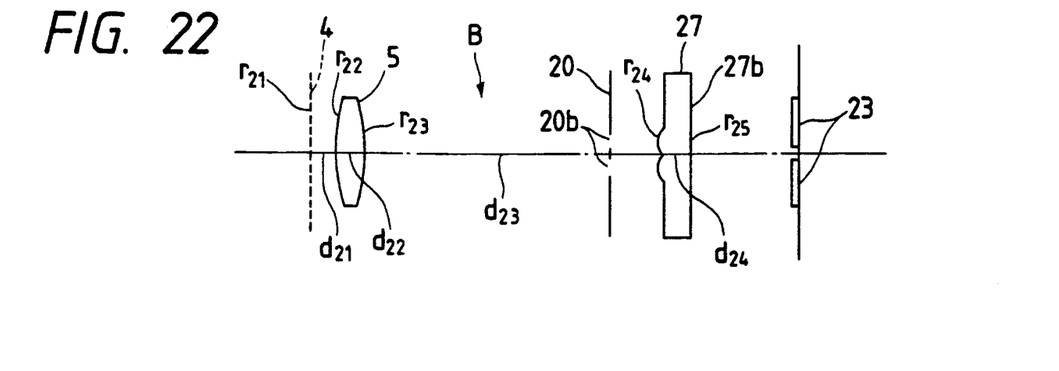
Figure 23:
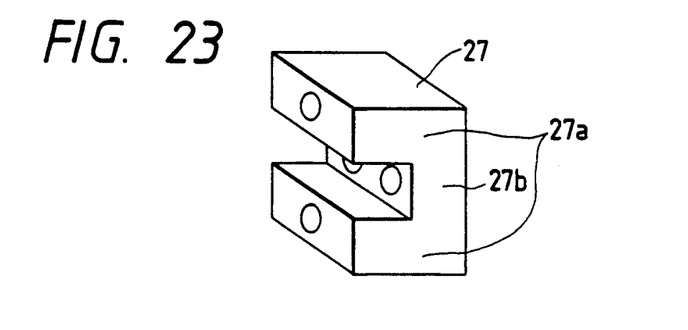
FIG. 23 is a perspective view showing a separator lens of the fourth embodiment.

Next, FIGS. 21 and 22 show a fourth embodiment of the present invention. FIG. 21 is a view showing the first focus detecting system A and FIG. 22 is a view showing the second focus detecting system B when turned 90° about the optical axis from the situation of FIG. 21. In these figure, instead of the separator lens 21 of the first embodiment, a separator lens 27 of approximately concave cross section shown in FIG. 23 is disposed. The separator lens 27 comprises a reimaging lens 27a, in the first focus detecting system A shown in FIG. 21, in which the plane of incidence of the light beams is provided, behind and adjacent to the apertures 20a of the aperture stop 20 and which has a large thickness, and a reimaging lens 27b, in the second focus detecting system B shown in FIG. 22, in which the plane of incidence of the light beams situated behind the apertures 20b of the aperture stop 20 is located farther away from the aperture stop 20 than that of the reimaging lens 27a and the plane of emergence is located at the same position as that of the reimaging lens 27a, and which has a less thickness. Thus, the reimaging lenses 27a and 27b have different principal points.

In the fourth embodiment, a pair of secondary images $I_{11}$ and $I_{12}$ and a pair of secondary images $I_{21}$ and $I_{22}$ are formed on the light receiving element arrays 22 and 23 by the first and second focus detecting systems A and B, respectively. Further, there is a difference in thickness between two reimaging lenses 27a and 27b, and the principal point of the reimaging lens 27a of the first focus detecting system A is positioned on the side of the condenser lens 5 with respect to that of the reimaging lens 27b of the second focus detecting system B, so that the focus detecting systems A and B are different in magnification, but the secondary images of both systems will be formed on substantially the same plane.

The lens data of the fourth embodiment are shown in Tables 7 and 8.

TABLE 7

(First focus detecting system)

| No. | r | d | n |
|---|---|---|---|
| 1 | $r_{11} = \infty$ | $d_{11} = 1.8$ | |
| 2 | $r_{12} = 9.73$ | $d_{12} = 2.7$ | $n_{11} = 1.4971$ |
| 3 | $r_{13} = -19.45$ | $d_{13} = 13.1$ | |
| 4 | $r_{14} = 2.28$ | $d_{14} = 5.0$ | $n_{12} = 1.4971$ |
| 5 | $r_{15} = \infty$ | | |
| | $\beta_1 = -0.44$ | | $F_{W1} = 6$ |

TABLE 8

(Second focus detecting system)

| No. | r | d | n |
|---|---|---|---|
| 1 | $r_{21} = \infty$ | $d_{21} = 1.8$ | |
| 2 | $r_{22} = 9.73$ | $d_{22} = 2.7$ | $n_{21} = 1.4971$ |
| 3 | $r_{23} = -19.45$ | $d_{23} = 14.1$ | |
| 4 | $r_{24} = 2.12$ | $d_{24} = 4.0$ | $n_{22} = 1.4971$ |
| 5 | $r_{25} = \infty$ | | |
| | $\beta_2 = -0.37$ | | $F_{W2} = 15$ |

Figure 24:
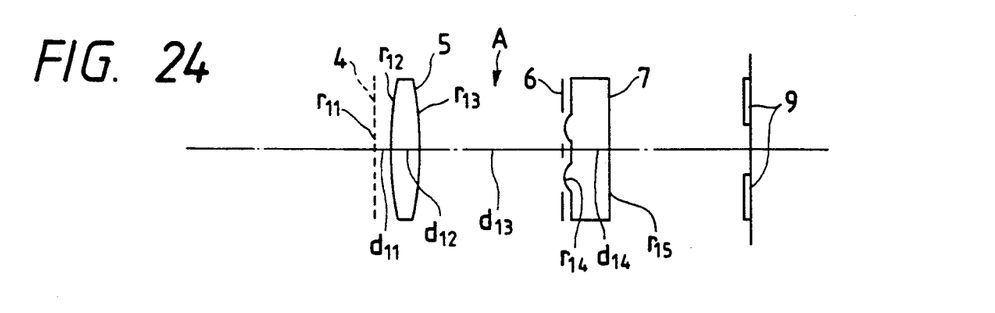
FIGS. 24 and 25 are views showing first and second focus detecting systems, respectively, in an optical system of a fifth embodiment according to the present invention.
Figure 25:
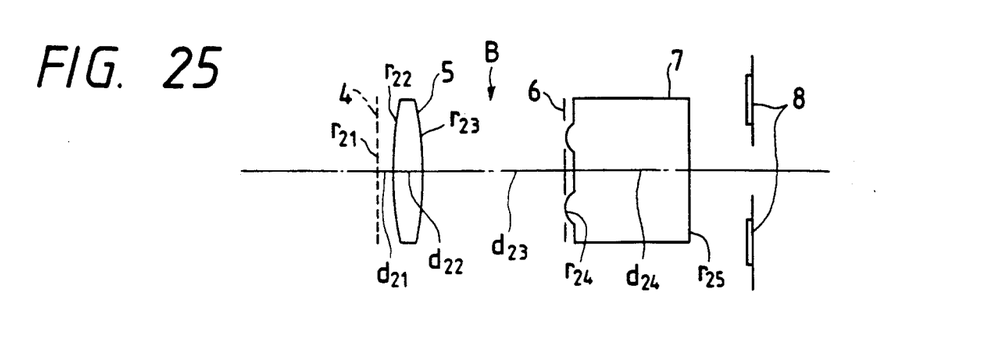

FIGS. 24 and 25 are directed to a fifth embodiment of the present invention. FIG. 24 shows a view of the arrangement of the first focus detecting system A and FIG. 25 is a view of the arrangement of the second focus detecting system B when turned 90° about the optical axis from the situation of FIG. 24. Although its basic optical arrangement is the same as in the second embodiment, the optical system is designed so that the relationship of $F_{W1}/\beta_1 = F_{W2}/\beta_2$ is established. The lens data of the fifth embodiment are shown in Tables 9 and 10.

TABLE 9

(First focus detecting system)

| No. | r | d | n |
|---|---|---|---|
| 1 | $r_{11} = \infty$ | $d_{11} = 1.8$ | |
| 2 | $r_{12} = 9.73$ | $d_{12} = 2.7$ | $n_{11} = 1.4971$ |
| 3 | $r_{13} = -19.45$ | $d_{13} = 13.1$ | |
| 4 | $r_{14} = 2.28$ | $d_{14} = 1.0$ | $n_{12} = 1.4971$ |
| 5 | $r_{15} = \infty$ | | |
| | $\beta_1 = -0.44$ | | $F_{W1} = 8.8$ |

TABLE 10

(Second focus detecting system)

| No. | r | d | n |
|---|---|---|---|
| 1 | $r_{21} = \infty$ | $d_{21} = 1.8$ | |
| 2 | $r_{22} = 9.73$ | $d_{22} = 2.7$ | $n_{21} = 1.4971$ |
| 3 | $r_{23} = -19.45$ | $d_{23} = 13.1$ | |
| 4 | $r_{24} = 1.92$ | $d_{24} = 4.8$ | $n_{22} = 1.4971$ |
| 5 | $r_{25} = \infty$ | | |
| | $\beta_2 = -0.35$ | | $F_{W2} = 7.0$ |

In comparison with the second focus detecting system B, the first focus detecting system A has a long focal length of the separator lens but a small thickness, and hence the light beams of the first and second focus detecting systems A and B are imaged on practically the same plane. Focusing can thus be performed by the system of stronger contrast of the first and second focus detecting systems A and B. If the contrast is equivalent, focusing can be accomplished by the second focus detecting system B free of the effect of refraction of the quick-return mirror. Further, in a lens having a large F number and a mirror telephoto lens, focus detection can be performed by the first focus detecting system A. Although in this case the first focus detecting system A undergoes the influence of the quick-return mirror, it makes smaller the difference between the incident angles due to its large F number, so that a large error is not produced. In other words, the focus detecting system with the highest accuracy receives the light beams with the smallest difference between their angles of incidence. Furthermore, the focus detecting system which receives the light beam with the largest angle of incidence also receives the light beams with the smallest difference between their angles of incidence.

Since, as mentioned above, the focus detecting device according to the present invention is designed so that the reimaging lenses of the first and second focus detecting systems are different in focal length or in principal point from each other, the conditions of the extension of the focus detecting are and the improvement of the focusing accuracy are satisfied at once, focus detection can be performed irrespective of the directions of contrast of the object, and the photographic lens of a relatively large F number is also applicable. Moreover, the focus detecting device has important advantages in practical use that the entire device is compact and its mounting is easy.

What Is claimed is:

1. A focus detecting device comprising:
   a photographing optical system for forming an image of an object;
   a first focus detecting system including:
      a first aperture section having a pair of apertures spaced enough to ensure focusing accuracy;
      a first reimaging optical system for re-forming said object image into a pair of images by means of a pair of beams of light passing through said first aperture section; and
      a first light receiving element for receiving a pair of first images re-formed by said first re-imaging optical system; and
   a second focus detecting system including:
      a second aperture section having a pair of apertures arranged in a direction different from said first aperture section;
      a second reimaging optical system having magnification and a focal length which are different from said first reimaging optical system, for re-forming said object image into a pair of images by means of a pair of beams of light passing through said second aperture section; and a second light receiving element for receiving a pair of second images re-formed by said second reimaging optical system.

2. The focus detecting device according to claim 1, wherein said reimaging optical system has a principal point different from said first reimaging optical system.

3. A focus detecting device comprising:
a photographing optical system for forming an image of an object;
a first focus detecting system including:
   a first aperture section having a pair of apertures spaced enough to ensure focusing accuracy;
   a first reimaging optical system for re-forming said object image into a pair of images by means of a pair of beams of light passing through said first aperture section; and
   a first light receiving element for receiving a pair of first images re-formed by said first reimaging optical system; and
a second focus detecting system including:
   a second aperture section having a pair of apertures arranged in a direction different from said first aperture section;
   a second reimaging optical system having magnification and a principal point which are different from said first reimaging optical system, for re-forming said object image into a pair of images by means of a pair of beams of light passing through said second aperture section; and
   a second light receiving element for receiving a pair of second images re-formed by said second reimaging optical system.

4. The focus detecting device according to any one of claims 1, 2 or 3, wherein said first light receiving element is disposed on the same plane as said second light receiving element.

5. The focus detecting device according to any one of claims 1, 2 or 3, wherein said first reimaging optical system and said second reimaging optical system are constructed of a single member as reimaging means.

6. The focus detecting device according to any one of claims 1, 2 or 3, wherein said first reimaging optical system is different in optical path length from said second reimaging optical system.

7. The focus detecting device according to claim 5, wherein said first reimaging optical system is different in distance between planes of incidence and emergence from said second reimaging optical system.

8. A focus detecting device comprising:
a photographing optical system for forming an image of an object;
a first focus detecting system including:
   a first aperture section having a pair of apertures spaced enough to ensure focusing accuracy;
   a first reimaging optical system for re-forming said object image into a pair of images by means of a pair of beams of light passing through said first aperture section; and
   a first light receiving element for receiving a pair of first images re-formed by said first reimaging optical system; and
a second focus detecting system including:
   a second aperture section having a pair of apertures arranged in a direction different from said first aperture section, said second aperture section being arranged on the same plane as said first aperture section;
   a second reimaging optical system having magnification and a focal length which are different from said first reimaging optical system, for re-forming said object image into a pair of images by means of a pair of beams of light passing through said second aperture section; and
   a second light receiving element for receiving a pair of second images re-formed by said second reimaging optical system.

9. The focus detecting device according to claim 8, wherein said reimaging optical system has a principal point different from said first reimaging optical system.

10. A focus detecting device comprising:
a photographing optical system for forming an image of an object;
a first focus detecting system including:
   a first aperture section having a pair of apertures spaced enough to ensure focusing accuracy;
   a first reimaging optical system for re-forming said object image into a pair of images by means of a pair of beams of light passing through said first aperture section; and
   a first light receiving element for receiving a pair of first images re-formed by said first reimaging optical system; and
a second focus detecting system including:
   a second aperture section having a pair of apertures arranged in a direction different from said first aperture section, said second aperture section being arranged on the same plane as said first aperture section;
   a second reimaging optical system having magnification and a principal point which are different from said first reimaging optical system, for re-forming said object image into a pair of images by means of a pair of beams of light passing through said second aperture; and
   a second light receiving element for receiving a pair of second images re-formed by said second reimaging optical system.

11. The focus detecting device according to any one of claims 8, 9 or 10, wherein said first reimaging optical system and said second reimaging optical system are constructed of a single member as reimaging means.

12. The focus detecting device according to any one of claims 8, 9 or 10, wherein said first reimaging optical system is different in optical path length from said second reimaging optical system.

13. The focus detecting device according to any one of claims 8, 9 or 10, wherein said first reimaging optical system is different in distance between planes of incidence and emergence from said second reimaging optical system.

14. A focus detecting device, comprising a focus detecting system including:
a condenser lens disposed adjacent to a present imaging plane of a photographing optical system;
an aperture stop having a pair of apertures spaced enough to ensure focusing accuracy;
a reimaging optical system disposed behind said aperture stop; and
light receiving element arrays disposed at positions of images reformed by said reimaging optical system so that two beams of light passing through different areas of said photographing optical system are received by said light receiving element arrays, and focus detection is performed by detecting a phase difference between output signals indicative of intensity distribution of light derived from said light receiving element arrays, said focus detecting system being constructed as plural focus detecting systems so as to vary directions in which apertures of said aperture stop are arranged in pairs, wherein said plurality of focus detecting systems are different in magnification from one another, and wherein reimaging optical systems of said plurality of focus detecting systems have at least one arrangement of different focal lengths and different principal points, thereby re-forming a plurality of images on the same plane.

* * * * *